United States Patent [19]
Shirano et al.

[11] 3,716,396
[45] Feb. 13, 1973

[54] PROCESS FOR PRODUCING POLYESTERS OF IMPROVED RUBBER ADHESION AND PRODUCT

[75] Inventors: Kenji Shirano; Toshihiko Yoshitake, both of Kurashiki, Japan

[73] Assignee: Kuraray Co., Ltd., Kurashiki, Japan

[22] Filed: April 15, 1971

[21] Appl. No.: 134,418

[52] U.S. Cl. ............... 117/76 T, 117/7, 117/47 A, 117/63, 117/72, 117/77, 117/80, 117/138.8 F, 156/110 A, 156/331
[51] Int. Cl. ..................... B32b 25/08, B32b 27/36
[58] Field of Search ...... 117/47 A, 138.8 F, 76 T, 77, 117/72, 80, 161 P; 156/331, 110 A

[56] References Cited

UNITED STATES PATENTS

| | | | |
|---|---|---|---|
| 3,449,200 | 6/1969 | Kalafus et al. | 117/47 A X |
| 3,305,430 | 2/1967 | Hennemann | 156/331 X |
| 3,607,507 | 9/1971 | Enos | 156/331 X |
| 3,597,391 | 8/1971 | Hara et al. | 117/161 PX |
| 3,499,853 | 3/1970 | Griebsch et al. | 156/331 X |

*Primary Examiner*—Ralph Husack
*Attorney*—William Kaufman and Barry Kramer

[57] ABSTRACT

Rubber adhesion properties of fibrous polyester materials are improved by a process which comprises applying a solution of an amine compound, such as polyethylene imine, to said fibrous material, subjecting the resulting fibrous material to heat treatment and then treating said fibrous material with an organic solvent solution of a polycarboxylic acid halide such as adipic acid dichloride.

20 Claims, No Drawings

PROCESS FOR PRODUCING POLYESTERS OF IMPROVED RUBBER ADHESION AND PRODUCT

This invention relates to improved polyesters. More particularly, this invention relates to polyesters of improved rubber adhesion and to methods of improving adhesion of fibrous polyester materials to rubber by modifying said fibrous materials.

Fibrous polyester materials such as, for example, filaments, yarns, strands, cords, cord-fabrics and the like, generally exhibit desirable properties as reinforcing materials for rubber, such as excellent tensile strength, shock resistance, stretch resistance, dimensional stability, heat resistance, chemical resistance and imperviousness to water.

The adhesive force, however, necessary for their practical application has been difficult to obtain by conventional adhesion treatments. For instance, the use of aqueous dispersions of a mixture of a partially condensed resorcinol-formaldehyde resin and a vinyl-pyridine copolymer latex, so-called RFL dispersion bonding agent, which is recognized as quite useful in bonding nylons and cellulose fibers to rubber, does not result in strong adhesion of polyester materials to rubber.

In view of the above, various preliminary treatments of the polyester have been proposed in combination with the known RFL bonding agents. For example, it is known that yarns, cords and fabrics of polyester can be treated with an aqueous solution of polyethylene imine (British Pat. No. 962,174) and the polyester filament can be treated with an aqueous dispersion of an expensive epoxy compound such as glycerol diglycidyl ether and an amine (U.S. Pat. No. 3,297,467). However, these methods do not impart sufficient rubber adhesion properties to polyesters. Because of the lack of sufficient adhesive forces at high temperatures, it has heretofore been difficult to use polyester materials treated by the aforesaid methods for the manufacture of rubber articles such as automotive tires and belts which are subjected to continuous bending or flexing for long periods of time.

Accordingly, it is an object of the present invention to provide polyesters exhibiting enhanced rubber adhesion.

It is another object of the present invention to provide an improved method of pretreating fibrous polyester materials in order to impart strong rubber adhesion properties thereto.

Still another object of the present invention is to provide pretreated fibrous polyester materials which can be bonded strongly to rubber by applying RFL bonding agent which is generally employed for improving the rubber adhesion of synthetic fibers.

A further object of the present invention is to improve the rubber adhesion properties of fibrous polyester materials by an easy and inexpensive method.

According to the present invention, it has now been found possible to impart high rubber adhesion to fibrous polyester materials by a process comprising the steps of applying to a fibrous polyester material a solution of an amine compound having at least two primary or secondary amino groups, heating the resulting fibrous material at a temperature above 50°C. and below the melting point of the polyester, and then treating said fibrous material with an organic solvent solution of aliphatic or aromatic poly-carboxylic acid halide having at least two acid halide groups.

The polyesters employed in the present invention are high molecular weight polyesters containing the carboxylic ester linkage as the main recurring structural unit. These polyesters are generally obtained from $\alpha,\omega$-glycols and dicarboxylic acids, and are preferably high molecular weight aromatic polyesters which are obtained from polymethylene glycols and aromatic dicarboxylic acids, such as for example, polyethylene terephthalate, which is derived from ethylene glycol and terephthalic acid.

In the present invention, the fibrous materials include staples, filaments, yarns, threads, cords, woven fabrics, knitted fabrics, non-woven fabrics and the like. These fibrous materials can contain additives or oiling agents such as catalysts, stabilizers, delustering agents and pigments employed in the course of manufacture thereof.

In the first stage of the present invention, the amine compounds to be applied to the polyester are compounds having at least two primary or secondary amino groups and can be widely selected from amino compounds having either low molecular weights or high molecular weights. For instance, aliphatic amines including ethylenediamine, hexamethylenediamine, triethylenetetramine, polyethylene imine and the like, and aromatic amines including metaphenylene diamine, methylene diamino phenyl methane and the like. These amine compounds can be employed alone or in combination with other similar amine compounds. Among these amine compounds, polyethylene imines having molecular weights of less than 100,000 are preferably used in the invention.

In the present invention, the amine compounds are applied to the fibrous polyester materials in the form of a solution. Solvents for this purpose are, preferably, water and lower alcohols such as methanol and ethanol from the viewpoint of cost, toxicity to human bodies and handling; however, ketones such as acetone and methyl ethyl ketone can also be used, if desired. The concentration of the amine compound in the solution can range from 0.01 to 50 weight percent, and preferably, ranges from 0.1 to 10 weight percent. The solution of an amine compound can be applied to the polyester material at temperatures ranging from room temperature to 100°C. by dipping the polyester material into said solution, by coating or spraying said solution onto said polyester material or by a combination thereof. The period of treatment is usually less than a few minutes. It is also possible to conduct the first stage process together with an oiling agent treatment by admixing the amine compound in the oiling bath.

In order to obtain enhanced adhesion of the polyester material to rubber in accordance with the present invention, at least about 0.01 weight percent of the amine compound must be picked up and retained by the polyester material during treatment with the amine solution. Since deposition of too much of the amine compound tends to impair the fibrous materials, a pick-up of less than 3 weight percent of the amine compound by the polyester material is preferred. The amine compound deposited on the fibrous polyester material reacts with an aliphatic or aromatic polycarboxylic acid halide applied to the polyester material in the third stage of the process of the present invention to produce hydrogen halide by-product. Thus, if desired, a small amount of an alkaline substance such as caustic soda, caustic potash and/or alkali metal salts such as sodium bicarbonate acting as an acceptor for the hydrogen halide can be added to the solution of the amine compound which is employed in the first stage of the present invention.

The amine-treated fibrous polyester materials obtained in the first stage, are next subjected to a heat treatment in the second stage of the present invention. Although not wishing to be bound by any theory or mechanism, it is currently believed that a portion of the amine compound which has been applied to the polyester material will react with the ester linkages of the polyester during the heat treatment and thereby produce amide linkages. Thus, the second stage may give rise to chemical combination of the amine component with the polyester. In any event, the heat treatment in the second stage of the present invention is considered critical in order that the fibrous polyester materials treated in accordance with the present invention may strongly adhere to rubber by the application of RFL bonding agents.

The heat treatment in the second stage is conducted at a temperature of not less than 50°C. and below the melting point of polyesters, preferably at 80°–200°C., and usually for a short time of less than a few minutes. Hot air, hot pins, hot plates, hot rollers and the like can be used for heating. The heat treatment also serves as a means for removing the solvent from the solution of the amine compound which has been applied to the fibrous polyester material in the first stage. This heat treatment can be conducted in combination with the drawing and heat-set treatment usually employed in the preparation of polyester fibers.

Typical of the aliphatic or aromatic polycarboxylic acid halides having at least two acid halide groups which can be employed in the third stage of the present invention are, for example, (A) diacid halides of oxalic acid, malonic acid, succinic acid, glutaric acid, adipic acid, pimelic acid, suberic acid azelaic acid, tricarballylic acid, 3-carboxy adipic acid, 4-carboxy pimelic acid, terephthalic acid, ortho phthalic acid, isophthalic acid, naphthalene-1,2-dicarboxylic acid, trimellitic acid, trimesic acid, benzene-1,2,3,4-tetracarboxylic acid and naphthalene-1,5-dicarboxylic acid, (B) triacid halides of tricarballylic acid, 3-carboxy adipic acid, 4-carboxy pimelic acid, trimellitic acid and trimesic acid and (C) tetra-acid halides of benzene-1,2,3,4-tetracarboxylic acid. Diacid halides of saturated aliphatic dicarboxylic acids having two to 15 carbon atoms and diacid halides of benzene dicarboxylic acids, for example, adipic acid dihalide and terephthalic acid dihalide are preferably used in the invention. Benzene dicarboxylic acid dihalides are most preferred since, as compared with aliphatic dicarboxylic acid dihalides, they are more stable upon exposure to moisture, less decomposable during storage and also easy to handle. The halides employed are preferably the chlorides or bromides.

The polycarboxylic acid halides are dissolved in organic solvents for use in the treatment of the fibrous polyester materials of the present invention. Typical solvents which can be employed are liquid aliphatic hydrocarbons such as n-hexane and n-octane; halogenated aliphatic hydrocarbons such as dichloromethane, chloroform, carbon tetrachloride; aromatic hydrocarbons such as benzene, toluene and xylene; halogenated aromatic hydrocarbons such as monochlorobenzene and dichlorobenzene; ethers such as ethyl ether and butyl ether; ketones such as acetone and methyl ethyl ketone; esters such as ethyl acetate, n-butyl acetate may be used.

The concentration of the polycarboxylic acid halide in the solution used for treating the polyester materials generally ranges from 0.1 to 30 weight %, and preferably ranges from 0.5 to 10 weight percent.

In the third stage of the process of the present invention, the solution of aliphatic or aromatic polycarboxylic acid halides having at least two acid halide groups is applied to the polyester materials which have been subjected to heat treatment in the abovedescribed second stage, in a similar manner to that employed in treating the polyester material with amine compound solution in the first stage. The amine compounds already coated on the surface of the fibrous polyester materials thereby react with the polycarboxylic acid halides to produce linear or cross-linked polyamides. Accordingly, it is desirable that a sufficient amount of polycarboxylic acid halide be employed in the organic solvent to react with all of the amine compound on the fibrous material. Since the reaction between the acid halides and amino groups is rapid even at a low temperature, the treatment of the polyester materials with an organic solvent solution of polycarboxylic acid halide can be satisfactorily conducted at room temperature. If desired, however, temperatures ranging from 0° to 100°C. can be used for the treatment. Contacting the polyester materials with treating agent in the third stage need not be any longer than a few minutes, and preferably, the third stage contact time ranges from 0.1 to 60 seconds. The fibrous polyester materials obtained from the above treatment can be washed with a dilute aqueous solution of caustic soda or caustic potash to eliminate hydrogen halides produced by the reaction which, if not removed, can form salts with the amino groups. Thereafter, the polyester material can be further washed with water and dried.

The fibrous polyester materials obtained through treatment in accordance with the present invention are covered with polyamides produced by the reaction of amine compounds and polycarboxylic acid halides, and said polyamides are at least partially chemically combined with the polyester materials probably because the amine compound chemically combines with the polyester. Enhanced rubber adhesion can be achieved, even though the amount of the polyamide so produced is only a few percent or less of the weight of the polyester material. It is generally not considered necessary to produce a polyamide coating of more than 10 percent of the weight of the polyester materials to achieve enhanced rubber adhesion.

The amine compounds and aliphatic or aromatic polycarboxylic acid halides used in the present invention are inexpensive, and are used in small amounts. However, it has been found that treatment in accordance with the present invention can impart excellent rubber adhesion properties to the polyester materials. Accordingly, the present invention can be economically conducted without damaging various desirable properties which are inherent in the polyester materials.

The method of the present invention is advantageously applied to undrawn or drawn filaments. Undrawn filaments can be drawn and heat-set after the treatment. Further, the method of the present invention can also be applied to fibrous materials other than filaments such as cords and woven fabrics, and the same effects are attainable regardless of the forms of said materials. Since the treatment of polyester materials in accordance with the present invention does not harden or stiffen said materials, such an operation as twisting the treated fibers into cords can be carried out in an entirely comparable manner as in the case of untreated fibers without any difficulties. Fibrous polyester materials treated by the present invention exhibit a strong adhesion to rubber upon subsequent use of RFL bonding agents, and the obtained adhesive force is high not only at around room temperature but also at temperatures as high as 100°C. Moreover, the degree of deterioration of the rubber adhesion imparted by the present invention is low even when maintained for a long time at a high temperature.

The present invention is further illustrated by the following examples. Unless otherwise specified, all percentages and parts are by weight.

EXAMPLE 1

A spun yarn of polyethylene terephthalate (600 denier/200 filaments) was drawn six times and heat-set to obtain a fiber of 1000 denier/200 filaments.

This fiber was dipped into an aqueous solution containing 0.5 weight percent polyethylene imine having a number-average molecular weight of 1,200 and then subjected to drying and heat treatment for 1 minute at 150°C. after squeezing the liquid. The thus treated fiber was then dipped in a n-hexane solution of adipic acid dichloride (2 weight percent) for 30 seconds, and then the solvent was removed by evaporation at 50°C.

Two of the thus treated fibers were twisted to make a tire cord of 1,000 d/1/2. The twist number was 470 turns/meter in a twist per yarn, and 470 turns/meter in twist per ply yarn. The cord thus obtained was dipped in a RFL dispersion of the recipe shown in the table 1 below, and thereafter the product was subjected to drying and heat treatment for one minute at 190°C.

TABLE 1

| | | |
|---|---|---|
| (1) | Resorcinol | 130 parts by weight |
| | Formalin (37%) | 190 parts by weight |
| | Sodium hydroxide | 1.3 parts by weight |
| | Water | 1,200 parts by weight |
| (2) | Vinyl pyridine latex (40%) (registered trademark "Hycar-2518FS" made by Japan Geon Co., Ltd.) | 3,000 parts by weight |
| (3) | Water | 1,500 parts by weight |

(1) was aged for six hours at room temperature after stirring, and further admixed with (2) and (3) and aged subsequently for 16 hours. The resultant product was used.

The cord thus treated was placed between rubber sheets designated A and B having the compositions respectively shown in table 2 below and vulcanization and adhesion of the cord was effected for 40 minutes under a pressure of 30 kg/cm² at a temperature of 140°C.

TABLE 2

| | |
|---|---|
| Rubber Compound A | |
| Natural rubber | 100 parts by weight |
| Zinc Oxide | 3 parts by weight |
| Carbon black | 35 parts by weight |
| Stearic acid | 1.5 parts by weight |
| Pine tar | 5 parts by weight |
| Accelerator | 1 parts by weight |
| Sulfur | 3 parts by weight |
| Antioxidant | 1 parts by weight |
| Rubber Compound B | |
| Natural rubber | 50 parts by weight |
| SBR | 50 parts by weight |
| Zinc Oxide | 2.5 parts by weight |
| Carbon black | 30 parts by weight |
| Stearic acid | 1 parts by weight |
| Pine tar | 5 parts by weight |
| Accelerator | 2.5 parts by weight |
| Sulfur | 2 parts by weight |
| Antioxidant | 1 parts by weight |

An adhesion test was conducted in accordance with the conventional H Piece test by determining the force required to pull out a cord being buried in the rubber of 1 cm width (at a temperature of 20°C.). The results are shown in the table 3. For comparative purposes, the results of the case (comparative example 1) where treatment with polyethylene imine was omitted and a treatment with adipic acid dichloride and the subsequent operations were carried out, the case (comparative example 2) where the treatment with adipic acid dichloride was omitted; the case (comparative example 3) where only RFL treatment and the subsequent operations were carried out and the case (comparative example 4) where the cord was treated with glycerol diglycidyl ether (epoxy compound) and hexamethylene diamine followed by RFL treatment are also shown.

TABLE 3

| | | Adhesive force (kg/cm) | |
|---|---|---|---|
| | | Rubber A | Rubber B |
| Example 1 | | 14.3 | 14.0 |
| Comparative Example | 1 | 7.8 | 8.0 |
| | 2 | 11.3 | 10.4 |
| | 3 | 8.6 | 8.2 |
| | 4 | 13.1 | 13.3 |

As is apparent from table 3, the present invention provides excellent rubber adhesion as compared with that of the other methods of treatment.

EXAMPLE 2

Example 1 was repeated using a n-hexane solution (concentration: 2 weight percent of terephthalic acid dichloride in lieu of the n-hexane solution (concentration: 2 weight percent) of adipic acid dichloroide. The results are shown in table 4. For comparative purposes, the result of the case (comparative example 5) where treatment with polyethylene imine was omitted and treatment with terephthalic acid dichloride and the subsequent operation were carried out is also shown.

TABLE 4

| | Adhesive force (kg/cm) | |
|---|---|---|
| | Rubber Compound A | Rubber Compound B |
| Example 2 | 14.1 | 13.9 |

| | | |
|---|---|---|
| Comparative Example 5 | 7.9 | 8.1 |

EXAMPLES 3–11

A polyethylene terephthalate yarn (1,000 denier/200 filaments) was dipped in an aqueous solution of polyethylene imine of number-average molecular weight of 1,200 of various concentrations as shown in table 5 and was subjected to drying and heat treatment at a temperature and for a period as shown in table 5 after having been squeezed with rollers. The yarn was then treated with a n-hexane solution of 2 weight percent adipic acid dichloride. After being dried, the yarn was twisted to make tire cord of 1,000 d/1/2. The twist number (470 turns/m) × (470 turns/m). The cord thus obtained was treated with the RFL dispersion described in table 1, and was adhered to the rubber compounds described in table 2. The results of the adhesion test are shown in table 5. Comparative example 6 showing the result of a rayon tire cord of 1,650 d/1/2 which has been treated with RFL is also shown in table 5. The determination of adhesive force was conducted in the same manner as that of example 1.

TABLE 5

| | Treating Conditions | | | Adhesive force (kg/cm) | |
|---|---|---|---|---|---|
| | concentration of the aqueous solution of polyethyllene imine (weight %) | Temperature of heat treatment °C | Time of heat treatment (seconds) | Rubber Compound A | Rubber Compound B |
| example 3 | 0.1 | 150 | 30 | 13.2 | 13.0 |
| 4 | " | " | 60 | 13.5 | 13.2 |
| 5 | " | 200 | 30 | 13.4 | 13.1 |
| 6 | 0.5 | 150 | 30 | 14.6 | 14.3 |
| 7 | " | " | 60 | 14.3 | 13.9 |
| 8 | " | 200 | 30 | 13.8 | 13.6 |
| 9 | 1.0 | 150 | 30 | 14.4 | 14.4 |
| 10 | " | " | 60 | 14.3 | 14.0 |
| 11 | " | 200 | 30 | 13.9 | 13.7 |
| Comparative Example 6 | — | — | — | 13.0 | 12.9 |

As is apparent from table 5, the present invention imparts adhesion to the polyethylene terephthalate fiber cord which is as good as the rubber adhesion of the rayon tire cord.

In adhering rubber compound A to tire cord, the adhesive force obtained in example 7 and comparative example 6 dropped, respectively to 12.7 kg/cm and 7.6 kg/cm at 100°C.

EXAMPLES 12–20

Employing a n-hexane solution (concentration: 2 weight percent) of sebacic acid dichloride in lieu of the n-hexane solution (concentration: 2 weight percent) of adipic acid dichloride, examples 3-11 were repeated. The results are shown in table 6.

TABLE 6

| | Treating Conditions | | | Adhesive force (kg/cm) | |
|---|---|---|---|---|---|
| | Concentration of the aqueous solution of polyethylene imine (weight %) | Temperature of heat treatment (°C) | Time of heat treatment (seconds) | Compound A | Compound B |
| example 12 | 0.1 | 150 | 30 | 13.3 | 13.0 |
| 13 | " | " | 60 | 13.4 | 13.2 |
| 14 | " | 200 | 30 | 13.4 | 13.2 |
| 15 | 0.5 | 150 | 30 | 14.5 | 14.3 |
| 16 | " | " | 60 | 14.3 | 14.0 |
| 17 | " | 200 | 30 | 13.7 | 13.6 |
| 18 | 1.0 | 150 | 30 | 14.6 | 14.1 |
| 19 | " | " | 60 | 14.1 | 14.0 |
| 20 | " | 200 | 30 | 13.8 | 13.6 |

EXAMPLES 21–29

Employing a n-hexane solution (concentration: 2 weight percent) of trimellitic acid trichloride in lieu of the n-hexane solution (concentration: 2 weight percent) of adipic acid dichloride, examples 3-11 were repeated. The results are shown in table 7. In adhesion test, the rubber compound A of table 2 was employed.

TABLE 7

| | Treating Conditions | | | Adhesive force |
|---|---|---|---|---|
| | Concentration of the aqueous solution of polyethylene imine (weight %) | Temperature of heat treatment (°C) | Time of heat treatment seconds) | (kg/cm) |
| example 21 | 0.1 | 150 | 30 | 13.0 |
| 22 | " | " | 60 | 13.2 |
| 23 | " | 200 | 30 | 13.1 |
| 24 | 0.5 | 150 | 30 | 13.9 |
| 25 | " | " | 60 | 13.6 |
| 26 | " | 200 | 30 | 13.4 |
| 27 | 1.00 | 150 | 30 | 13.8 |
| 28 | " | " | 60 | 13.8 |
| 29 | " | 200 | 30 | 13.4 |

EXAMPLES 30–32

A polyethylene terephthalate fiber (1,000 denier/200 filaments) was dipped in an aqueous solution (concentration of 0.5 percent) of polyethylene imine of number-average molecular weight of 1,800 and dried and heat treated for 30 seconds at 150°C. after having been squeezed with rollers. The so-treated fiber was dipped in a n-hexane solution of adipic acid dichloride of the concentration shown in table 8 for a period of 10 seconds.

After drying, the two yarns were plied to make a tire cord of 1,000 d/1/2. The cord thus obtained was dipped in the RFL dispersion of table 1, dried and heat treated for a period of 1 minute at 190°C. The treated cord was adhered to the rubber compounds described in table 2. The results of the adhesion test are shown in table 8.

TABLE 8

| | Concentration of adipic acid dichloride (weight %) | Adhesive force (kg/cm) | |
|---|---|---|---|
| | | Rubber A | Rubber B |
| example 30 | 0.1 | 13.6 | 13.4 |
| 31 | 2.0 | 14.3 | 14.0 |
| 32 | 10.0 | 13.3 | 13.2 |

EXAMPLES 33-35

Employing sebacic acid dichloride in lieu of adipic acid dichloride, examples 30-32 were repeated. The results are shown in table 9.

TABLE 9

| Concentration of Sebacic acid dichloride (weight %) | Adhesive force (kg/cm) Rubber A | Rubber B |
|---|---|---|
| example 33  0.1 | 13.5 | 13.2 |
| 34  2.0 | 14.5 | 14.2 |
| 35  10.0 | 13.4 | 13.1 |

EXAMPLES 36-38

Employing terephthalic acid dichloride in lieu of adipic acid dichloride, examples 30-32 were repeated. The results are shown in table 10.

TABLE 10

| Concentration of terephthalic acid dichloride (weight %) | Adhesive Force (kg/cm) Rubber A | Rubber B |
|---|---|---|
| example 36  0.1 | 13.7 | 13.5 |
| 37  2.0 | 14.1 | 13.9 |
| 38  10.0 | 13.4 | 13.3 |

EXAMPLES 39-42

A polyethylene terephthalate yarn (1,000 denier/200 filaments) was dipped in an aqueous solution of polyethylene imine of number average molecular weight of 1,200 containing sodium bicarbonate as an additive, and squeezed with rollers. After being dried and heat treated in an oven at 100°C., the yarn was dipped into a carbon tetrachloride solution of 2 weight percent adipic acid dichloride for a period of 20 seconds. After being dried, the two yarns were plied to a twist number of (470 turns/m) × (470 turns/m) to give a tire cord of 1,000 d/1/2. The thus obtained cord was treated with the RFL dispersion described in table 1, and was then adhered to rubber in the same manner as in example 1. The results are shown in table 11.

TABLE 11

| | Concentration of polyethylene imine (weight %) | Concentration of sodium bicarbonate (weight %) | Adhesive force (kg/cm) Rubber A | Rubber B |
|---|---|---|---|---|
| example 39 | 0.1 | 0.2 | 14.1 | 13.8 |
| 40 | 0.5 | 0.2 | 14.2 | 13.9 |
| 41 | 0.5 | 0.5 | 13.7 | 13.2 |
| 42 | 5.0 | 0.2 | 13.9 | 13.7 |

Analysis with an attenuated total reflection infrared spectrometer and the weight increase showed that, in example 42, the fiber obtained after the treatment with adipic acid dichloride was deposited with 0.3 percent of polyamide based on the weight of the fiber.

EXAMPLES 43-47

A polyethylene terephthalate tire cord (1,000 d/1/2, twist number (470 turns/m) × (470 turns/m) ) was dipped into an aqueous solution of polyethylene imine of number average molecular weight 1,800 and then, after being squeezed of the excess solution by rollers, the resulting cord was heat treated under non-relaxed conditions. Subsequently, this tire cord was passed through a 2 weight percent n-hexane solution of adipic acid dichloride. The period for immersion in the solution was 10 seconds. After drying, the tire cord was treated with RFL dispersion as described in example 1. Employing the rubber compounds used in example 1, adhesion tests of the tire cords were carried out. The results are shown in table 12. For comparative purposes, the results of the case where treatment with adipic acid dichloride was omitted (Comparative examples 7, 8, 9, 10, 11) are also shown in table 12.

TABLE 12

| | Concentration of polyethylene imine (weight %) | Heat Treatment Temperature (°C) | Time (minutes) | Adhesive force (kg/cm) Rubber A | Rubber B |
|---|---|---|---|---|---|
| example 43 | 1.0 | 150 | 0.5 | 13.9 | 13.7 |
| 44 | 0.5 | " | 0.5 | 14.0 | 14.1 |
| 45 | 0.5 | " | 1.0 | 14.2 | 14.0 |
| 46 | 1.0 | " | 0.5 | 14.3 | 13.9 |
| 47 | 5.0 | " | 0.5 | 14.0 | 13.9 |
| Comparative example 7 | 0.1 | " | 0.5 | 8.3 | 8.1 |
| 8 | 0.5 | " | 0.5 | 9.3 | 9.4 |
| 9 | 1.0 | " | 0.5 | 9.8 | 9.6 |
| 10 | 1.0 | " | 1.0 | 10.2 | 9.9 |
| 11 | 5.0 | " | 0.5 | 9.9 | 9.5 |

EXAMPLES 48-52

Examples 43-47 were repeated using a n-hexane solution of terephthalic acid dichloride (concentration: 2 weight percent) in lieu of the n-hexane solution of adipic acid dichloride (concentration: 2 weight percent). The results are shown in table 13. For comparative purposes, the results of cases where heat treatment was eliminated (the tire cord was dried at room temperature) are shown as comparative examples, 12 to 14.

TABLE 13

| | Concentration of polyethylene imine (weight %) | Heat Treatment Temperature (°C.) | Time (minutes) | Adhesive force (kg/cm) Rubber A |
|---|---|---|---|---|
| example 48 | 0.1 | 150 | 0.5 | 18.6 |
| 49 | 0.5 | " | 0.5 | 13.9 |
| 50 | 0.5 | " | 1.0 | 14.3 |
| 51 | 1.0 | " | 0.5 | 14.4 |
| 52 | 5.0 | " | 0.5 | 14.2 |
| Comparative example 12 | 0.1 | — | — | 8.9 |
| 13 | 0.5 | — | — | 9.2 |
| 14 | 1.0 | — | — | 9.0 |

EXAMPLES 53-57

Employing a n-hexane solution (concentration: 2 weight percent) of trimesic acid trichloride in lieu of the n-hexane solution (concentration: 2 weight percent) of adipic acid dichloride, examples 43-47 were repeated. The results are shown in table 14. In the adhesion tests, rubber compound A was employed.

TABLE 14

| | Concentration of polyethylene imine (weight %) | Heat treatment Temperature (°C) | Time (minutes) | Adhesive force (kg/cm) Rubber A |
|---|---|---|---|---|
| example 53 | 0.1 | 150 | 0.5 | 13.1 |
| 54 | 0.5 | " | 0.5 | 13.3 |
| 55 | 0.5 | " | 1.0 | 13.6 |
| 56 | 1.0 | " | 0.5 | 13.7 |
| 57 | 5.0 | " | 0.5 | 13.2 |

EXAMPLES 58-60

A polyethylene terephthalate fiber (1,000 denier/200 filaments) was dipped into a 1 weight percent aqueous solution of a variety of amine compounds as shown in table 15. After excess solution was squeezed out of the fiber with rollers, the fiber was subjected to drying and heat treatment for three minutes at 70°C. The fiber was then dipped into a n-hexane solution of 2 weight percent adipic acid dichloride for a period of 20 seconds. After being dried, these filaments were plied to produce a tire cord of 1,000 d/1/2, having the twist number of (470 turns/m) × (470 turns/m). This cord was treated with the RFL dispersion of table 1. Table 15 summarizes the excellent results obtained in the adhesion test with the rubber compounds of table 2.

TABLE 15

| | Amine Compound | Adhesive force (kg/cm) Rubber A | Rubber B |
|---|---|---|---|
| example 58 | ethylene diamine | 13.8 | 13.6 |
| 59 | triethylene tetramine | 13.9 | 14.0 |
| 60 | metaphenylene diamine | 14.0 | 13.9 |

EXAMPLES 61-63

A polyethylene terephthalate fiber of the type used in examples 58-60 was dipped into an aqueous solution (concentration: 0.5 percent) of polyethylene imine having a number-average molecular weight of 1,200, and subjected to drying and heat treatment for the period of 1 minute at 150°C. after the excess solution had been squeezed out of the fiber. This fiber was then dipped into a n-hexane solution of adipic acid dibromide having a variety of concentrations as shown in table 16 for 30 seconds. The fiber was then washed with water and dried, and plied to give a tire cord of 1,000 d/1/2 having a twist number (470 turns/m) × (470 turns/m). The tire cord was treated with the RFL dispersion of table 1. Table 16 shows the excellent results obtained in the adhesion tests carried out with the rubber compounds of table 2.

TABLE 16

| | Concentration of adipic acid dibromide (weight %) | Adhesive force (kg/cm) Rubber A | Rubber B |
|---|---|---|---|
| example 61 | 0.5 | 13.7 | 13.8 |
| 62 | 1.0 | 14.2 | 14.0 |
| 63 | 2.0 | 14.3 | 14.1 |

EXAMPLES 64-66

Employing pimelic acid dichloride in lieu of adipic acid dibromide, examples 61-63 were repeated. The results are shown in table 17.

TABLE 17

| | Concentration of pimelic acid dichloride (weight %) | Adhesive force (kg/cm) Rubber A | Rubber B |
|---|---|---|---|
| example 64 | 0.5 | 13.8 | 13.7 |
| 65 | 1.0 | 14.1 | 13.9 |
| 66 | 2.0 | 14.4 | 14.0 |

EXAMPLES 67-72

Employing a n-hexane solution (concentration: 1 weight percent of the various aliphatic dicarboxylic acid dihalides enumerated in table 18 in lieu of the n-hexane solution of adipic acid dibromide, example 62 was repeated. The results are shown in table 18. The rubber compound A of table 2 was used in the adhesion test.

TABLE 18

| | Acid Halide | Adhesive force (kg/cm) |
|---|---|---|
| example 67 | Oxalic acid dichloride | 13.8 |
| 68 | Malonic acid dichloride | 13.7 |
| 69 | Succinic acid dichloride | 13.5 |
| 70 | Glutaric acid dichloride | 13.5 |
| 71 | Azelaic acid dichloride | 13.4 |
| 72 | Sebacic acid dibromide | 13.3 |

EXAMPLES 73-75

Employing terephthalic acid dibromide in lieu of adipic acid dibromide, examples 61-63 were repeated. The results are shown in table 19.

TABLE 19

| | Concentration of terephthalic acid dibromide (weight %) | Adhesive force (kg/cm) Rubber A | Rubber B |
|---|---|---|---|
| example 73 | 0.5 | 13.8 | 13.9 |
| 74 | 1.0 | 14.0 | 14.1 |
| 75 | 2.0 | 14.3 | 14.3 |

EXAMPLES 76-78

Employing the aromatic dicarboxylic acid dichlorides summarized in the following table 20 in lieu of adipic acid dibromide, example 62 was repeated. The results are shown in table 20. The rubber compound A of table 2 was used in the adhesion test.

TABLE 20

| | Aromatic dicarboxylic acid dichloride | Adhesive force (kg/cm) |
|---|---|---|
| example 76 | Orthophthalic acid dichloride | 13.6 |
| 77 | Isophthalic acid dichloride | 13.4 |

| 78 | Naphthalene dicarboxylic acid dichloride | 13.3 |

EXAMPLES 79–81

Examples 61–63 were repeated using benzene-1,2,3,4-tetracarboxylic tetrachloride in lieu of adipic acid dibromide. The results are shown in table 21. The rubber compound A of table 2 was used in the adhesion test.

TABLE 21

| | Concentration of benzene-1,2,3,4-tetracarboxylic tetrachloride (weight %) | Adhesive force (kg/cm) |
|---|---|---|
| example 79 | 0.5 | 13.0 |
| 80 | 1.2 | 13.7 |
| 81 | 2.0 | 13.8 |

EXAMPLES 82–85

Employing the various carboxylic acid trihalides enumerated in the following table 22 in lieu of adipic acid dibromide, example 62 was repeated. The results are shown in table 22.

The rubber compound A of the table 2 was used in the adhesion test.

TABLE 22

| | Acid Halide | Adhesive force (kg/cm) |
|---|---|---|
| example 82 | tricarballylic acid trichloride | 13.4 |
| 83 | 3-carboxy adipic acid trichloride | 13.1 |
| 84 | 4-carboxy pimelic acid trichloride | 13.1 |
| 85 | trimellitic acid tribromide | 13.2 |

EXAMPLES 86–89

Polyethylene terephthalate tire cords of the type used in examples 43–47 were dipped into methanol solutions (concentration: 1.0 weight percent) of polyethylene imine or ethylene diamine and heat treated under the conditions shown in table 23 after having the excess solution squeezed out.

The heat treated cords were dipped into a n-hexane solution (concentration: 2 weight percent) of adipic acid dichloride for a period of 10 seconds, dried and treated with the RFL dispersion of table 1, and then adhered to the rubber compound A in the identical manner as in example 1. The results are shown in table 23.

TABLE 23

| | Amine Compound | Heat treatment Temperature (°C) | Time (minutes) | Adhesive force (kg/cm) |
|---|---|---|---|---|
| example 86 | Polyethylene imine | 150 | 0.5 | 15.1 |
| 87 | " | " | 1.0 | 15.0 |
| 88 | " | " | 2.0 | 15.0 |
| 89 | Ethylene diamine | " | 0.5 | 14.8 |

What is claimed is:

1. Process for the treatment of polyesters impart enhanced rubber adhesion thereto which comprises applying to a polyester, a solution of an amine compound having at least two primary or secondary amino groups, subjecting the resulting polyester to heat treatment at a temperature above 50°C. and below the melting point of the polyester, then treating the heat treated polyester with a solution of an aliphatic or aromatic polycarboxylic acid halide having at least two acid halide groups in an organic solvent, and evaporating the solvent, whereby enhanced rubber adhesion is imparted thereto.

2. Process as defined in claim 1 wherein the polyester is an aromatic polyester.

3. Process as defined in claim 1 wherein the amine compound is a polyethylene imine having a molecular weight of less than 100,000.

4. Process as defined in claim 1 wherein the solution of the amine compound is an aqueous solution.

5. Process as defined in claim 1 wherein the solution of the amine compound is a lower alcoholic solution.

6. Process as defined in claim 1 wherein the concentration of the amine in the solution ranges from 0.01 to 50 weight percent.

7. Process as defined in claim 1 wherein the solution of amine compound is applied to the polyester at temperatures ranging from room temperature to 100°C.

8. Process as defined in claim 1 wherein from 0.01 to 3 weight percent of the amine compound is picked up by the polyester during treatment.

9. Process as defined in claim 1 wherein the solution of amine compound additionally contains an alkaline hydrogen halide acceptor.

10. Process as defined in claim 1 wherein the heat treatment is conducted at temperatures of from 80° to 200°C.

11. Process as defined in claim 1 wherein the amine compound is a polyethylene imine, and the aliphatic or aromatic polycarboxylic acid having at least two acid halide groups is a saturated aliphatic dicarboxylic acid halide containing from two to 15 carbon atoms or a benzene dicarboxylic acid dihalide.

12. Process as defined in claim 1 wherein the concentration of the aliphatic or aromatic polycarboxylic acid halide in the treating solution ranges from 0.1 to 30 weight percent.

13. Process as defined in claim 1 wherein the aliphatic or aromatic polycarboxylic acid halide solution is applied to the polyester at temperatures ranging from 0° to 100°C.

14. Process as defined in claim 1 wherein the aliphatic or aromatic polycarboxylic acid halide solution is applied to the polyester for a period of time ranging from 0.1 to 60 seconds.

15. Process as defined in claim 1 wherein the resulting polyester is washed with an aqueous alkaline solution to remove hydrogen halides produced during treatment.

16. Process as defined in claim 1 wherein an aqueous dispersion of a mixture of a partially condensed resorcinol-formaldehyde resin in a vinyl pyridine copolymer latex is applied to the treated polyester to effect adhesion to rubber.

17. A fibrous polyester material exhibiting enhanced adhesion to rubber prepared by the process of claim 16.

18. A polyester exhibiting enhanced adhesion to rubber prepared by the process of claim 1.

19. Process for treating fibrous polyester materials comprising applying to a fibrous polyethylene terephthalate material, an aqueous or alcoholic solution of a polyethylene imine in a concentration of from 0.1 to 10 weight percent, heating the resulting material at a temperature of from 80° to 200°C., then applying to the heat treated material a solution comprising 0.5 to 10 weight percent of a saturated aliphatic dicarboxylic acid dihalide containing from two to 15 carbon atoms in organic solvent, and evaporating the solvent.

20. Process for treating fibrous polyester materials which comprises applying to a fibrous polyethylene terephthalate material, an aqueous or alcoholic solution of a polyethylene imine having a concentration of 0.1 to 10 weight percent, heating the resulting material at a temperature of from 80° to 200°C., then applying to the heat treated material a 0.5 to 10 weight percent solution of a benzene dicarboxylic acid dihalide in an organic solvent, and evaporating the solvent.

* * * * *